Nov. 4, 1947.  M. KATCHER  2,430,429
BRACKET FOR BICYCLE GENERATORS OR THE LIKE
Filed Feb. 25, 1944  2 Sheets-Sheet 1
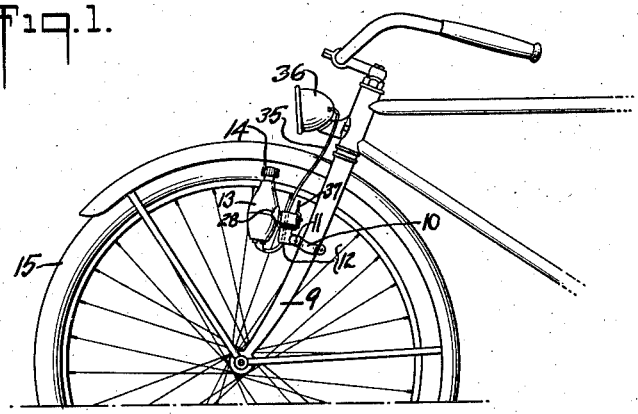
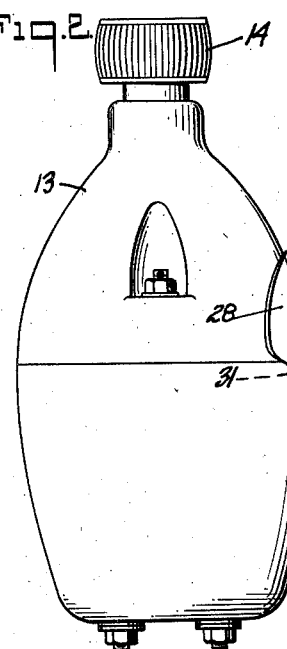
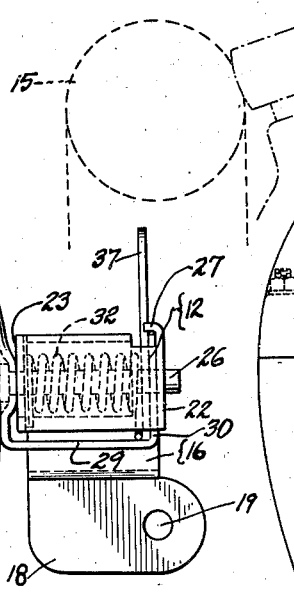
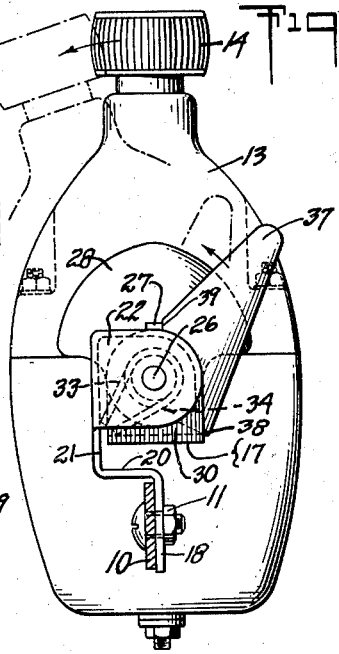
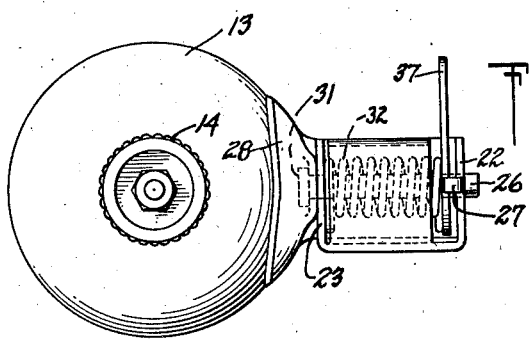
INVENTOR
*Morris Katcher.*
BY
*Emanuel Scheyer*
ATTORNEY Nov. 4, 1947.  M. KATCHER  2,430,429
BRACKET FOR BICYCLE GENERATORS OR THE LIKE
Filed Feb. 25, 1944  2 Sheets-Sheet 2
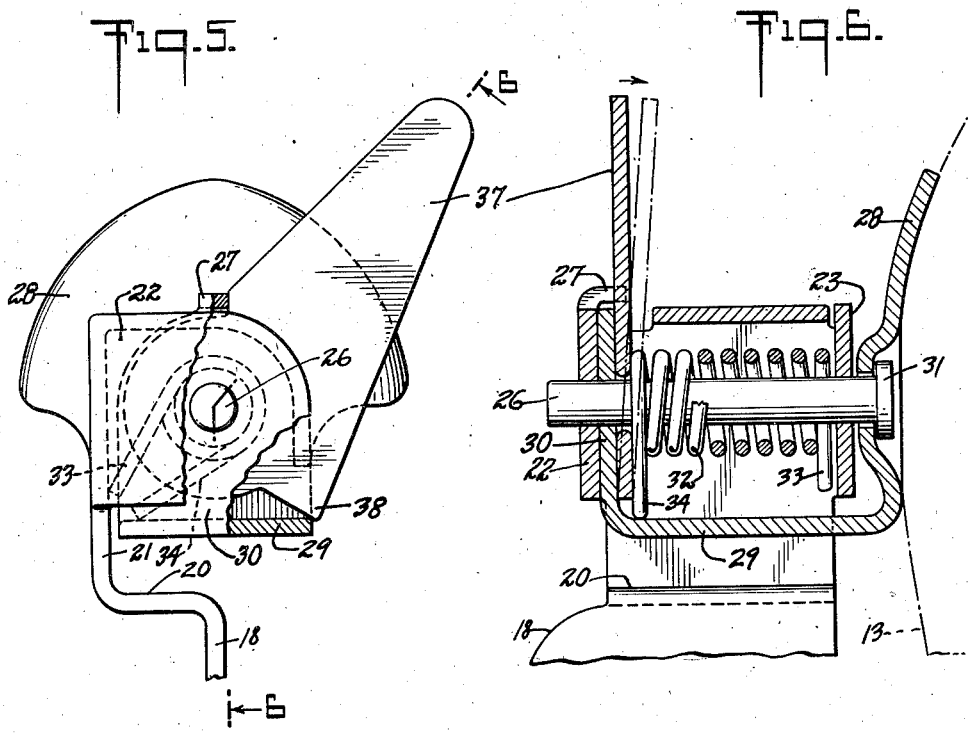
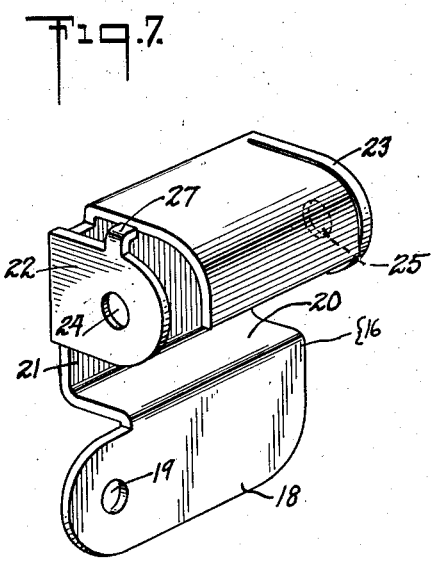
INVENTOR
*MORRIS KATCHER.*
BY
*Emanuel Scheyer*
ATTORNEY Patented Nov. 4, 1947

2,430,429

UNITED STATES PATENT OFFICE 2,430,429

BRACKET FOR BICYCLE GENERATORS OR THE LIKE

Morris Katcher, New York, N. Y., assignor to Chefford Master Manufacturing Co., Inc., Fairfield, Ill., a corporation of Illinois Application February 25, 1944, Serial No. 523,850

11 Claims. (Cl. 248—226)

1

This invention relates to a bracket for bicycle generators or the like. Such generators, which are well known to the art, are used to create a current for a light. The bracket is clamped to the bicycle, preferably to the fork of the front wheel, and fixed to the generator. The generator used is one which has a driving element engaging and rotated by the front tire. The bracket or support comprises two main parts, one of which is clamped to the bicycle and the other part of which is fastened to the generator. The latter part is rotatably mounted with respect to the former. A special handle or lever construction is provided, which when manually operated rotates the movable part so that the driving element is withdrawn from the tire. The two main parts have a shaft extending through them which serves as a pivot for the rotatable part although it is not necessarily fixed to it or the stationary part. The handle is loose on the shaft and can also be given a wabble or axial motion. A spring normally holds the generator so that its driving element is in contact with the tire, the handle moving the movable part against the tension of the spring by having a heel on it which grips the movable part. The handle is used also to interlock with an interlocking element provided on the stationary part to hold the generator in disengaged position.

Other objects and advantages will become apparent upon further study of the description and drawings in which:

Fig. 1 is an elevation to a small scale of the generator and its supporting bracket shown attached to the front wheel fork of a bicycle.

Fig. 2 is an elevation of the generator and its supporting bracket shown by themselves.

Fig. 3 is an elevation of the generator and its supporting bracket taken at right angles to that of Fig. 2, full lines showing the generator in inoperative position and dotted lines in operative position against a tire.

Fig. 4 is a top view of the generator and its supporting bracket.

Fig. 5 is a partial elevation of the supporting bracket, to an enlarged scale, shown with the manually operated lever set for inoperative position of the generator.

Fig. 6 is a section taken along the line 6—6 of Fig. 5.

Fig. 7 is a perspective view of the stationary portion without its clamp of the supporting bracket shown by itself, and Fig. 8 is a perspective view of the manually operated lever shown by itself.

2

Electric generator 13 is pivotally supported by a bracket denoted in its entirety by the numeral 12, which is attached by means of a bolt 11 to its clamp portion 10. Clamp 10 is firmly bolted to front wheel fork 9 of a bicycle. Generator 13 is normally held by spring actuated means, as will be explained, so that its driving wheel or element 14 presses against tire 15 of the front wheel of the bicycle. When the wheel and its tire 15 rotate wheel 14 of the generator, it produces an electric current which is led by wires in conduit 35 to lamp 36, causing the latter to glow. Bracket 12 is composed of two main parts, one part 16 which is held stationary by its clamp 10 and the other part 17 which is fixed to generator 13 and swings with it.

Stationary part 16 has a tongue 18 with a hole 19 in it through which bolt 11, Figs. 1, 3 and 7, is passed for fastening said part to clamp 10. Tongue 18 projects downward from the front edge of a shelf 20. A web 21 projects upward from the rear of shelf 20. Arm 22 projects forwardly from one edge of web 21 while arm 23 projects from its other edge. Holes 24 and 25 are provided in arms 22 and 23 respectively. Pivot pin or shaft 26, Fig. 6 is journaled or it could be fixed in holes 24 and 25. A hook or interlocking element 27 is provided on the top of arm 22, for a purpose to be explained.

The swinging part 17 of bracket 12 has a curved arm 28 which is fixedly attached to generator 13. Arm 28 is integral at its bottom with base 29, at one end thereof, an arm 30 extending upward from the other end of said base. Arms 28 and 30 are each provided with a hole which is in axial alignment with holes 24 and 25 in stationary part 16 so that pivot pin 26 can pass through all four of them. Pivot pin 26 has a head 31, Fig. 6, which is located behind a bulge in arm 28, said head keeping the pin from moving axially out of said four holes. While pivot pin or shaft 26 is shown extending through a hole provided in arm 28, it will be readily understood that this hole can be omitted and the end of the shaft butted against said arm and welded thereto. About pivot pin 26 is a helical spring 32 which is stressed in torsion, one end 33 of the spring reacting against web 21 of stationary part 16 and the other end 34 of the spring reacting against base 29. Spring 32 will normally hold movable part 17 and with it generator 13 so that contact wheel or driving element 14 will bear against tire 15. Under these conditions when the bicycle is traveling, current will be generated and light 36 will shine.

Lever or handle 37 is provided so that when the bicycle rider wants the generator to be inoperative, as in the daytime, he can swing the generator and its wheel 14 out of contact with tire 15. Lever 37 is loosely mounted on pivot pin 26 adjacent arm 22 of the stationary part 16 of the bracket. The bottom edge of said lever is provided with a heel 38, Figs. 3, 5 and 8, while its upper edge has a shoulder 39. When contact wheel 14 is in engagement with tire 15, lever 37 and generator 13 have the position shown for them, in dotted lines in Fig. 3. Now, when it is desired to stop the generator from generating current by disengaging its driving element 14 from tire 15, lever 37 is tilted axially to the right, as shown in dotted lines in Fig. 6, against the pressure of spring 32 to clear the end of hook or interlocking element 27. Lever 37 is then turned clockwise, Fig. 3, until it passes hook 27. When lever 37 has passed hook 27, it is tilted and pushed back axially by spring 32 to the position shown by the solid lines in Fig. 6. By so doing hook 27 interlocks with lever 37, engaging shoulder 39 of the latter. In turning lever 37 clockwise, its heel 38 presses down against base 29 rotating, against the tension of spring 32, movable part 17 and with it generator 13, withdrawing its driving element 14 from tire 15.

I claim:

1. A support for a bicycle generator with a driving element for engagement with the tire of the bicycle, said support comprising a stationary part fixed to the bicycle, a movable part fixed to the generator, a shaft extending through said parts, said shaft serving as the pivotal mounting of the movable part with respect to the stationary part, a spring engaging both parts being normally tensioned to turn the movable part to have said driving element engage the tire, a lever rotatably mounted on the shaft and engageable with the movable part for manually turning the latter against the tensioning of the spring to disengage the driving element from the tire, and an interlocking element on the stationary part engaging the lever for holding the movable part in disengaged position when so set.

2. A support for a bicycle generator with a driving element for engagement with the tire of the bicycle, said support comprising a stationary part fixed to the bicycle, a movable part fixed to the generator, a shaft extending through said parts, said shaft serving as the pivotal mounting of the movable part with respect to the stationary part, a spring engaging the stationary part and the movable part, said spring being tensioned to hold the movable part with said driving element in engagement with the tire, a handle loosely mounted on the shaft for axial and rotational motion with respect to the shaft and engageable with the movable part for manually turning the latter against the tension of the spring to disengage the driving element from the tire and an interlocking element on the stationary part for directly engaging and holding the handle when the movable part is moved to disengaged position.

3. A support for a bicycle generator with a driving element for engagement with the tire of the bicycle, said support comprising a stationary part attached to the bicycle, a movable part fixed to the generator, each of said parts having a pair of arms extending from it, a shaft engaging all of said arms and extending through aligned openings provided in at least the three arms farthest away from the generator, said shaft serving as the pivotal mounting of the movable part, the arms of one part alternating with those of the other part along the shaft, an arm of the stationary part being farthest away from the generator and an arm of the movable part being nearest to and fastened to the generator, a spring engaging both parts being normally tensioned to hold the movable part with said driving element in engagement with the tire, and an interlocking element on one of said parts for holding the movable part in disengaged position, when so set, against the tension of the spring.

4. A support for a bicycle generator with a driving element for engagement with the tire of the bicycle, said support comprising a stationary part fixed to the bicycle, a movable part fixed to the generator, a shaft extending through said parts, said shaft serving as the pivotal mounting of the movable part with respect to the stationary part, a spring coiled about the shaft engaging at one end the stationary part and at its opposite end the movable part, said spring being tensioned to hold the movable part with said driving element in engagement with the tire, a handle loosely mounted on the shaft and tiltable axially with respect thereto, said spring normally holding the handle without tilting, and an interlocking element on the stationary part, said handle when rotated engaging the movable part and rotating the latter against the tension of the spring to disengage the driving element from the tire, said handle when so rotated being tilted against the pressure of the spring in order to pass by the interlocking element, once passing the latter being pushed out of its tilt by the spring into locking engagement with the interlocking element.

5. A support for a bicycle generator with a driving element for engagement with the tire of the bicycle, said support comprising a stationary part attached to the bicycle, a movable part fixed to the generator, each of said parts having a pair of arms extending from it, a shaft extending through aligned openings provided in the arms, said shaft serving as the pivotal mounting of the movable part, an arm of the movable part being nearest to and fastened to the generator, an enlarged head on the shaft located between said latter arm and the generator preventing axial motion of the shaft away from the generator, the shaft being rotatably mounted in said latter arm, a spring engaging both parts being normally tensioned to hold the movable part with said driving element in engagement with the tire, and an interlocking element on one of said parts for holding the movable part in disengaged position, when so set, against the tension of the spring.

6. A support for a bicycle generator with a driving element for engagement with a tire of the bicycle, said support comprising a stationary part attached to the bicycle, a movable part fixed to the generator, each of said parts having a pair of arms extending from it, a shaft engaging all of said arms and extending through aligned openings provided in at least the three arms farthest away from the generator, said shaft serving as the pivotal mounting of the movable part, a spring coiled about the shaft and engaging both parts, said spring being normally tensioned to hold the movable part with said driving element in engagement with the tire, the arms of one part alternating with those of the other part along the shaft, an arm of the stationary part being farthest away from the generator and an arm of the movable part being nearest to and fastened to the generator, in between said latter arms is the second arm of the movable part located substantially adjacent said farthest arm and urged axially toward it by one end of the spring, the other end of the spring reacting against the second arm of the stationary part, and an interlocking element on the stationary arm farthest away from the generator for holding the movable part in disengaged position, when so set, assisted by the axial force of the spring.

7. A support for a bicycle generator with a driving element for engagement with the tire of the bicycle, said support comprising a stationary part fixed to the bicycle, a movable part fixed to the generator, a shaft extending through said parts, said shaft serving as the pivotal mounting of the movable part, a spring engaging both parts being normally tensioned to hold the movable part with said driving element in engagement with the tire, a handle mounted on the shaft and rotatable with respect to both parts, said handle being provided with a heel which engages the movable part when the handle is turned to rotate the movable part against the tension of the spring to disengage the driving element from the tire, and an interlocking element on the stationary part engaging the handle to hold the generator in disengaged position when so set.

8. A support for a bicycle generator with a driving element for engagement with the tire of the bicycle, said support comprising a stationary part fixed to the bicycle, a movable part fixed to the generator, a shaft extending through said parts, said shaft serving as the pivotal mounting of the movable part, a spring engaging both parts being normally tensioned to hold the movable part with said driving element in engagement with the tire, a handle mounted on the shaft for manually turning the movable part against the tensioning of the spring to disengage the driving element from the tire, and an interlocking element on the stationary part in the path of the handle as it is rotated to disengage the driving element, the mounting of the handle on the shaft being loose enough to permit the axial diversion of the handle past the interlocking element as it is rotated, and the return axially of the handle to lock with the interlocking element when once rotated past the latter.

9. A support for a bicycle generator as claimed in claim 8 in which the spring which normally holds the movable part with the driving element in engagement with the tire also presses axially against the handle causing it to resist axial diversion.

10. A support for a bicycle generator with a driving element for engagement with the tire of the bicycle, said support comprising a stationary part fixed to the bicycle, a movable part fixed to the generator, a shaft extending through said parts, said shaft serving as the pivotal mounting of the movable part with respect to the stationary part, a spring engaging both parts being normally tensioned to hold the movable part with said driving element in engagement with the tire, a handle rotatably mounted on the shaft and engaging the movable part for manually turning the latter against the tension of the spring to disengage the driving element from the tire, and an interlocking element on the stationary part, said handle being formed with a shoulder on its periphery which engages the interlocking element when the handle has been rotated for rotating the movable part into disengaged position.

11. A support for a bicycle generator with a driving element for engagement with the tire of the bicycle, said support comprising a stationary part fixed to the bicycle, a movable part fixed to the generator, a shaft extending through said parts, said shaft serving as the pivotal mounting of the movable part, a spring engaging both parts being normally tensioned to hold the movable part with said driving element in engagement with the tire, a handle mounted on the shaft for manually turning the movable part against the tensioning of the spring to disengage the driving element from the tire, and an interlocking element on the stationary part in the path of the handle as it is rotated to disengage the driving element, the mounting of the handle on the shaft permitting the handle to be tilted against the spring past the interlocking element as it is rotated, and tilted back by the spring to lock with the interlocking element when once rotated past the latter.

MORRIS KATCHER.

REFERENCES CITED

The following references are of record in the file of this patent:

UNITED STATES PATENTS

| Number | Name | Date |
| --- | --- | --- |
| 1,106,446 | Gordon et al. | Aug. 14, 1914 |
| 1,073,747 | Eichert | Sept. 23, 1913 |
| 2,088,029 | McDermott | July 27, 1937 |